Oct. 24, 1944.   N. J. BROWN   2,361,082
METHOD OF MAKING WATERPROOF TRACING CLOTH
Filed Sept. 29, 1941
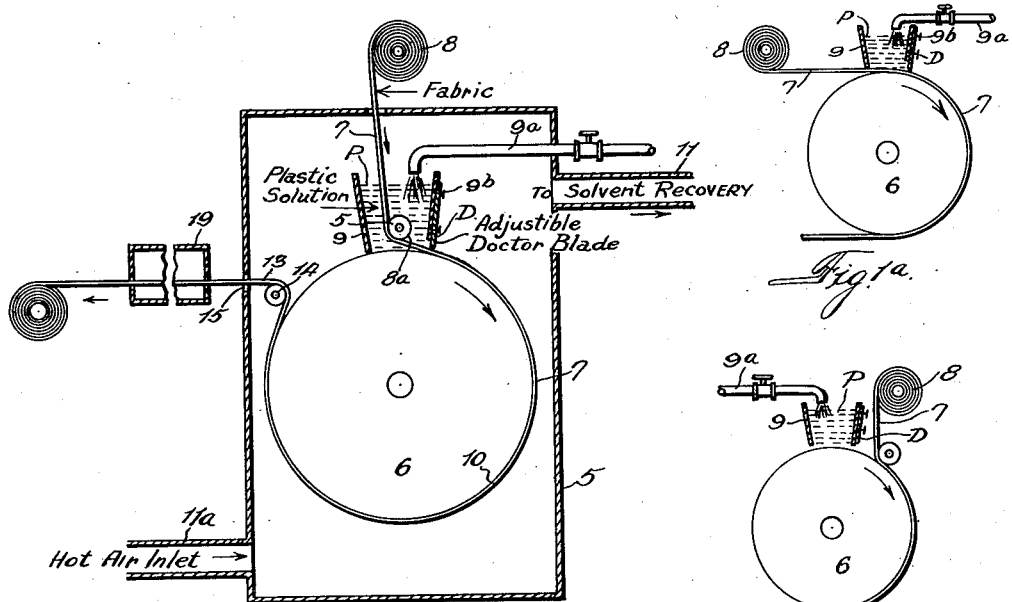
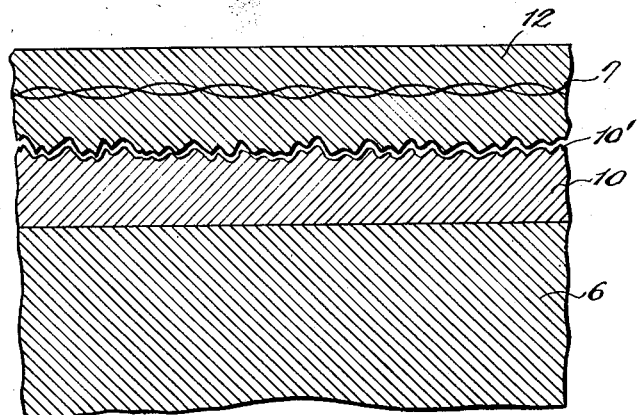
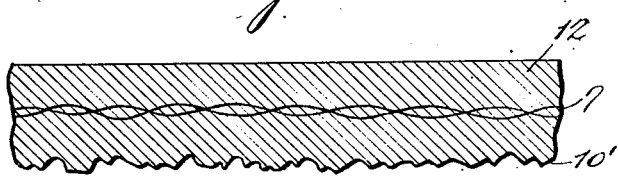

Patented Oct. 24, 1944

2,361,082

UNITED STATES PATENT OFFICE 2,361,082

METHOD OF MAKING WATERPROOF TRACING CLOTH

Nathan J. Brown, Barrington, Ill.

Application September 29, 1941, Serial No. 412,778

1 Claim. (Cl. 117—110)

The present invention relates to an improved form of tracing cloth or similar material which is composed in greater part, or entirely, of a water-insoluble material, at least one side being roughened so as to be receptive to pencil marks, India ink and similar marking materials.

One of the objects of the invention is to produce a tracing cloth or tissue composed of material which is substantially inert to water and which nevertheless can be marked on with either a pencil or ink—for example, India ink—and which is of sufficient translucency or transparency to be employed as a negative for the making of blueprints and similar photographically reproduced copies. At the same time, by virtue of its water insolubility and water resistance, the material is capable of being washed so that water-soluble inks applied thereto can, if desired, be subsequently readily removed. Furthermore, the material may be made of a substance which is also resistant to certain solvents such as hydrocarbons, so that greasy markings or even ordinary pencil markings may be readily removed therefrom by swabbing with a fibrous material which has been wetted or dampened with such a liquid. In other words, the tracing cloth or tissue is capable of being used for the purpose of making either original tracings or copies of tracings, drawings, and the like in precisely the same manner as ordinary tracing cloth has hitherto been used, but with the exception that the material is water resistant or waterproof and therefore can freely withstand wetting without harm.

In its preferred embodiment the tracing cloth consists of a piece of a finely woven or felted web which may be either cloth or paper which has been impregnated with a flexible plastic composition in which it is completely embedded so that both sides of the basic web will contain an unbroken layer of the plastic composition. At least one side of this plastic layer is provided with a roughened surface so as to make it acceptable to pencil marks and the like.

A further object of the invention is the production of an internally reinforced tissue or film made of plastic material, at least one surface of which has been roughened so as to accept pencil marks, drawing ink, and the like.

Another object of the invention relates to a method of producing the material, which in the case of the impregnated web is specifically illustrated in the hereunto appended drawing, in which Fig. 1 is a diagrammatic cross sectional elevation of a preferred method of producing the material;

Figs. 1a and 1b show certain permissible modifications;

Fig. 2 is an enlarged section of a part of Fig. 1; and

Fig. 3 is an enlarged section of the finished material.

The material employed for carrying out the present invention may be any suitable type of plastic substance which is capable of being formed into a sheet or film. Preferentially, the film is formed from a solution of a plastic composition in a suitable volatile solvent which is capable of being applied to a forming surface which has been prepared in such a manner as to leave a roughened imprint upon the resulting film. Among the plastic materials suitable for the purpose of this invention may be any organic-solvent-soluble plastic material to which there may have been added modifying and plasticizing ingredients known in the plastics art. More specifically, it has been found that the cellulose esters and ethers have particular applicability; and applicant's preferred material consists of a solution of cellulose acetate or cellulose butyrate to which a plasticizer has been added.

Referring, for example, to Fig. 1, there may be provided in a suitable housing 5 a rotatable cylinder 6 which is rotated in the direction of the arrow shown thereon. Applied to this cylinder under suitable tension, so as closely to hug the same, is a web of suitable fabric 7 which may be a closely woven material or may even be paper, this material being constantly unwound from a supply roll 8 thereof. Shortly after the fabric web 7 contacts the cylinder 6, it passes over the roller 8a and through a body of the dissolved plastic material P contained in the hopper 9, which is supplied through line 9a. A doctor blade, D, controls the thickness of the film. This is adjustable by suitable means diagrammatically illustrated by the screws 9b. This solution of dissolved plastic may consist of, for example, 3.75 parts by weight of commercial acetone, about one part by weight of cellulose acetate having a viscosity of approximately 60, and 0.25 part by weight of a plasticizer such as dimethyl phthalate, diethyl phthalate, dibutyl phthalate, or similar alkyl phthalate or equivalent plasticizing material. This composition is a freely flowing solution, although it is endowed with considerable viscosity. It is, however, thin enough so that it will penetrate the web 7 clear through so that the resulting still wet film may come into contact with the surface of the cylinder 6. The surface of this cylinder has been suitably roughened so that it will act as a mold for producing a roughened surface on one side of the plastic material. For a desirable type of surface, it is advantageous to have the cylinder made of a suitable metal which is plated with a layer of copper. To this copper layer there may be applied a layer of organic material which is insoluble in the solvent used in the plastic composition. A suitable material for this purpose is an aqueous solution of gelatin to which there has been added a sufficient amount of a soluble bichromate such as ammonium, sodium or potassium bichromate, so that upon the drying of the composition and exposure to light, the gelatin will be rendered substantially water-insoluble and tough. Alternatively, the copper surface of the cylinder may be coated with an aqueous solution of gelatin which is subsequently hardened by means of a tanning agent—for example, formaldehyde. After the gelatin layer has hardened—irrespective of whether this has been accomplished by utilization of a bichromating agent or by means of a tanning agent—and the layer has completely dried, a sandblast may be directed against the gelatin surface to develop a certain roughness therein. This roughness should be fine enough so that a pencil may be applied to the eventual film and leave a clear and legible mark. As the plastic material gets into contact with the roughened gelatin layer, which is indicated on the drawing by the reference numeral 10 (but is so thin as to be invisible thereon), the roughened surface will be accurately reproduced on the film, of course being the exact reverse of the actual minute irregularities of the gelatin layer. In case a roughened metallic surface is used, the effect is, of course, the same. Such a surface may be produced by sandblasting or etching the metal.

Within the housing 5, but not specifically shown, there are means for heating and also means 11 for exhausting the air which has become laden with the solvent vapor; that is to say, the acetone. Means for admitting heated air are provided in the form of the pipe 11a. As a result of the heating, which may in part be also accomplished by heating the cylinder, the solvent will be evaporated, thus leaving a film of plastic material in which there is embedded the fabric layer 7.

By the time the wheel has made about three-quarters revolution, the film is substantially dry, or at least hard enough to be peeled from the cylinder 6. The web 7, which is now, being embedded in plastic and forming a new entity, indicated by the reference numeral 13, passes over the roller 14 and leaves the housing 5 through the opening 15. It then passes through the secondary drier 19 which is purely diagrammatically illustrated and is of course provided with heating and ventilating means to assist in the elimination of the volatile solvent. In any event, at the end of this drier the material issues in its final condition to be rolled up on the take-up roll 18, or cut into suitable sizes, as desired.

A modified manner of manufacturing the material is diagrammatically illustrated in Figs. 1a and 1b. Thus in Fig. 1a, the web 7, unrolling from the supply roll 8, contacts the cylinder 6 ahead of the hopper 9, so that the plastic solution P is applied to the upper side of the fabric. By reason of the permeability of the fabric, however, the plastic will penetrate through it, and hence contact the roughened surface of the cylinder 6. The other operations are the same as shown in Fig. 1. In Fig. 1b, the plastic P is shown as being applied to the surface of cylinder 6 ahead of the fabric 7, which is applied to the freshly formed still liquid layer of plastic shortly beyond the doctor blade D. By reason of the permeability of the fabric, it will subside into the liquid plastic some of which also penetrates to the outside layer of the plastic. All three methods produce the same kind of finished product.

Referring to Fig. 3, there is shown on a greatly magnified scale a portion of the cylinder 6 and the thereto applied gelatin layer 10 which, as will be seen at the point 10', is provided with the roughened surface which is the result of the sandblasting. The internal layer of fabric 7 is suitably indicated on the drawing, and the layer of plastic material 12 (resulting from the drying of the plastic solution P) may be seen as substantially contacting the roughened surface 10', also exhibiting a smooth surface on the outside, which is uppermost in Fig. 2. Fig. 3 shows the finished article containing the central web 7, the smooth side of the plastic layer 12, and the roughened surface thereof 10'.

It is, of course, possible to omit the central web 7, in which case the plastic composition above is applied to the roughened surface of the cylinder, which may be either the aforementioned gelatin surface or a metallic surface which has been roughened by sandblast, etching, or the like.

The utilization of the film or tracing cloth made in accordance with the present invention will of course be obvious. It may be laid, with its smooth unroughened surface downward, upon a sketch or drawing, whereafter the sketch may be traced either in pencil or suitable drawing ink. If pencil is first used, the lines may subsequently be inked in where desired, whereupon any extraneous or uninked lines may be freely sponged from the material by means of a wad of cotton or similar fibrous material which has been dampened with an organic solvent which has no effect on the plastic. Such solvent may be a hydrocarbon such as gasoline, carbon tetrachloride, and the like.

Ordinary tracing cloth of commerce has hitherto been made of a thin web of fabric to which starch sizing has been applied. While this was quite transparent and readily acceptable to pencil and ink, and from which pencil markings could be removed by means of gasoline or carbon tetrachloride, it could not withstand wetting because that would immediately dissolve the starchy sizing layer, rendering the fabric permeable to ink and entirely useless for its purpose. The improved tracing cloth of the present invention, however, is entirely waterproof, will not transmit ink, and—while the pencil markings are easily removable—the ink likewise can be removed by means of water or aqueous solvents unless the ink is of such a nature as not inherently to be water-soluble. Thus, if a mistake is made in the case of ordinary India ink, it can be softened by means of water and completely removed without harming the tracing cloth in any way; and after the moisture applied has evaporated, further inking can be proceeded with.

Another advantage of a tracing cloth of the present character lies in the fact that it may be used in the open field as a construction drawing, for example, particularly if inked with waterproof ink; and even though it should be exposed to elements such as rain, it will not be harmed in any way, unless of course the ink is water-soluble. Thus, by using a water-insoluble India ink on the water-resistant tracing cloth of the present invention, a completely water-resistant tracing can be produced. The tracing cloth of this invention is also desirable in case tracings are placed in storage where they are likely to be flooded or otherwise exposed to the elements, because even in the case of such accidents the tracings are not destroyed.

Instead of the cellulose acetate composition specifically described, it will, of course, be possible to use some other cellulose plastic—for example, cellulose nitrate, cellulose butyrate, cellulose benzoate, cellulose propionate, cellulose aceto-nitrate, ethyl cellulose or other cellulose ether. Other plastics which suggest themselves for the present purpose are various types of vinyl resins or suitably plasticized high polymer condensation products, rubber derivatives, and the like.

The invention is not to be circumscribed or limited by the particular examples shown, which have been given solely for the purpose of illustrating and explaining the invention.

It may be stated that suitable heating, when working with the specific composition of the present invention, is to have the wheel heated to about 102° F. while the chamber 5 is maintained at a temperature of about 210° F. This heating may be accomplished by internal heating coils or electrically, or by passing suitably heated air or gases into the chamber 5. In order to suppress fire hazard, it may be advisable to employ air which has been deprived of most of its oxygen—for example, using flue gases for this purpose. The mixture of gas or air and solvent issuing from the vent 11 may be passed to a suitable solvent recovery apparatus which forms no part of the present invention and is well known in the film forming and plastics industry.

As a preferred embodiment, the fabric employed as the central layer of the tracing cloth may be a thin cotton fabric such as batiste or very fine muslin; in fact, the cloth used at the present time for making ordinary tracing cloth of commerce is suitable for the purpose, and it is the contemplation of the inventor to use this material for the web 7 in the drawing.

Other modifications which will readily occur to those familiar with the art into which this invention falls are to be construed as within the scope and intent of the present inventor, who claims:

Continuous process of producing a waterproof tracing cloth capable of accepting pencil markings on one side, and of sufficient transparency to permit its use as a negative for the making of blue prints and the like, which comprises forming upon the peripheral surface of a cylindrical film-wheel a thereto tightly adhering organic-solvent-insoluble layer of a water-insolubilized dry albuminous material, roughening said layer by sand blasting, continuously applying to said sand blasted layer while slowly in motion a substantially continuous web of fabric while at the same time applying to said fabric a solution of a plasticized water-insoluble cellulose ester in an organic readily vaporizable solvent, and effecting the evaporation of said solvent while the fabric is still on said wheel, thus to form a film of plasticized cellulose ester within and on both sides of said fabric, and thereafter when dry stripping it from the albuminous layer, whereby a rough, pencil-accepting surface is formed on the cellulose ester film on the side thereof which had been in contact with the roughened albuminous layer.

NATHAN J. BROWN.